US012078619B2

(12) United States Patent
Ortmann (10) Patent No.: US 12,078,619 B2
(45) Date of Patent: Sep. 3, 2024

(54) INJECTOR SERVING MULTIPLE SAMPLE SEPARATION APPARATUSES

(71) Applicant: Agilent Technologies, Inc., Santa Clara, CA (US)

(72) Inventor: Thomas Ortmann, Ottenhausen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 410 days.

(21) Appl. No.: 17/288,478

(22) PCT Filed: Oct. 26, 2018

(86) PCT No.: PCT/IB2018/058381
§ 371 (c)(1),
(2) Date: Apr. 23, 2021

(87) PCT Pub. No.: WO2020/084334
PCT Pub. Date: Apr. 30, 2020

(65) Prior Publication Data
US 2021/0389282 A1 Dec. 16, 2021

(51) Int. Cl.
*G01N 30/20* (2006.01)
*B01D 15/18* (2006.01)
(Continued)

(52) U.S. Cl.
CPC ......... *G01N 30/20* (2013.01); *B01D 15/1885* (2013.01); *G01N 30/22* (2013.01);
(Continued)

(58) Field of Classification Search
CPC ......... B01D 15/1885; G01N 2030/202; G01N 2030/207; G01N 30/16–24; G01N 30/20;
(Continued)

(56) References Cited

U.S. PATENT DOCUMENTS 5,419,208 A 5/1995 Schick
6,012,487 A 1/2000 Hauck
(Continued)

FOREIGN PATENT DOCUMENTS

CN 203465247 U 3/2014
CN 1106442752 A 2/2017
(Continued)

OTHER PUBLICATIONS

International Search Report mailed on Jun. 28, 2019 for Application No. PCT/IB2018/058381; 7 pages.
(Continued)

*Primary Examiner* — David L Singer (57) ABSTRACT

An injector, for injecting a fluidic sample in at least one selected one of a first sample separation apparatus and a second sample separation apparatus, includes a valve arrangement fluidically connectable to the first sample separation apparatus and the second sample separation apparatus, a sample accommodation volume for accommodating the fluidic sample, and a control unit configured for controlling the valve arrangement so that fluidic sample in the sample accommodation volume is selectively injectable into the selected first sample separation apparatus and/or second sample separation apparatus.

20 Claims, 5 Drawing Sheets

(51) Int. Cl.
  *G01N 30/22* (2006.01)
  *G01N 30/46* (2006.01)
  *G01N 30/60* (2006.01)

(52) U.S. Cl.
  CPC ....... *G01N 30/466* (2013.01); *G01N 30/6043* (2013.01); *G01N 2030/202* (2013.01); *G01N 2030/207* (2013.01)

(58) Field of Classification Search
  CPC ... G01N 30/22; G01N 30/466; G01N 30/6043
  See application file for complete search history.

(56) References Cited

U.S. PATENT DOCUMENTS

| | | | | |
|---|---|---|---|---|
| 6,318,157 | B1 * | 11/2001 | Corso | G01N 30/466 |
| | | | | 210/659 |
| 2002/0020670 | A1 * | 2/2002 | Petro | G01N 30/466 |
| | | | | 210/656 |
| 2005/0269264 | A1 * | 12/2005 | Fermier | G01N 30/36 |
| | | | | 210/136 |
| 2012/0132013 | A1 * | 5/2012 | Glatz | G01N 30/20 |
| | | | | 73/863.02 |
| 2013/0014566 | A1 * | 1/2013 | Marks | G01N 30/24 |
| | | | | 73/61.55 |
| 2015/0253294 | A1 * | 9/2015 | Ohashi | G01N 30/8658 |
| | | | | 73/61.57 |
| 2015/0253295 | A1 * | 9/2015 | Ohashi | G01N 30/32 |
| | | | | 73/61.56 |
| 2016/0069844 | A1 | 3/2016 | Jackson et al. | |
| 2017/0343518 | A1 | 11/2017 | Thielsch et al. | |
| 2018/0284079 | A1 * | 10/2018 | Yasunaga | G01N 30/32 |

FOREIGN PATENT DOCUMENTS

| | | | |
|---|---|---|---|
| CN | 107449852 | A | 12/2017 |
| CN | 108037233 | A | 5/2018 |
| DE | 2731652 | A1 * | 1/1979 |
| DE | 102012217848 | A1 * | 4/2014 |
| DE | 102012217855 | A1 * | 4/2014 |
| DE | 102014109551 | A1 * | 1/2016 |
| EP | 1577012 | A1 | 9/2005 |
| EP | 2993471 | A1 | 3/2016 |
| EP | 3252463 | A1 | 12/2017 |
| WO | 0064557 | A1 | 11/2000 |
| WO | 2004111631 | A1 | 12/2004 |
| WO | WO-2016075503 | A1 * | 5/2016 |

OTHER PUBLICATIONS

Chinese Office Action and Search Report dated Jul. 29, 2023 for 201880098850.6; 10 pages.

Chinese Office Action with translation dated Jul. 29, 2023 for 201880098850.6; 22 pages (originally cited with IDS dated Aug. 23, 2023).

Chinese Office Action with translation dated Jun. 28, 2024 for 201880098850.6; 5 pages.

\* cited by examiner

INJECTOR SERVING MULTIPLE SAMPLE SEPARATION APPARATUSES

RELATED APPLICATIONS

This application is the national stage under 35 U.S.C. 371 of International Application No. PCT/IB2018/058381, filed Oct. 26, 2018, the entire contents of which are incorporated by reference herein.

It is an object of the invention to provide an injector for a sample separation system with improved functionality.

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering unit. This usually occurs in the presence of a significantly smaller pressure than what the separation unit is run with. Thereafter, an injector valve is switched so as to introduce the intaken amount of fluidic sample from the sample loop of a metering path into the separation path between fluid drive unit and the separation unit for subsequent separation.

However, the functionality of an injector is still limited.

SUMMARY

It is an object of the invention to provide an injector for a sample separation system with improved functionality. The object is solved by the independent claims. Further embodiments are shown by the dependent claims.

According to an exemplary embodiment of the present invention, an injector for injecting a fluidic sample in at least one selected one of a first sample separation apparatus and a second sample separation apparatus (i.e. selectively in the first sample separation apparatus and/or in the second sample separation apparatus) is provided, wherein the injector comprises a valve arrangement being fluidically connectable to the first sample separation apparatus and to the second sample separation apparatus, a sample accommodation volume for accommodating the fluidic sample, and a control unit configured for controlling the valve arrangement so that fluidic sample in the sample accommodation volume is selectively injectable into the first sample separation apparatus and/or into the second sample separation apparatus.

According to another exemplary embodiment, a sample separation system for separating a fluidic sample is provided, wherein the sample separation system comprises a first sample separation apparatus for separating the fluidic sample, a second sample separation apparatus for separating the fluidic sample, and an injector having the above-mentioned features, being fluidically coupled with the first sample separation apparatus and the second sample separation apparatus and being configured for selectively injecting the fluidic sample in a selected one of the first sample separation apparatus and/or the second sample separation apparatus.

According to still another exemplary embodiment, a method of injecting a fluidic sample selectively into at least one of a first sample separation apparatus and a second sample separation apparatus is provided, wherein the method comprises accommodating the fluidic sample in a sample accommodation volume, and switching a valve arrangement being fluidically connected to the first sample separation apparatus and to the second sample separation apparatus so that the fluidic sample in the sample accommodation volume is selectively injected into a selected one of the first sample separation apparatus and/or the second sample separation apparatus depending on a switching state of the valve arrangement.

According to an exemplary embodiment of the invention, an injector for injecting fluidic sample in a respective sample separation apparatus is provided, wherein the injector has the capability of selectively injecting the fluidic sample into a connected first sample separation apparatus and/or into a connected second sample separation apparatus (in particular sequentially or simultaneously). Thus, the injector may have the capability of serving more than one sample separation apparatus for sample injection into the respective sample separation apparatus. In other words, multiple sample separation apparatuses may share a common injector for sample injection purposes. By taking this measure, a compact sample separation system may be provided which is operable with low hardware and software effort. By such an embodiment, the functionality of an injector for a sample separation system may be extended without reducing flexibility or performance thereof. In contrast to this, flexibility and functionality for a user during operating a sample separation system may be improved, because a user may select, without additional effort, which of multiple sample separation apparatuses shall be used for separating a fluidic sample to be injected via the injector. By such a sample separation system, it is also possible that one of the sample separation apparatuses is presently operated to separate fluidic sample injected by the injector, while simultaneously the other sample separation apparatus prepares for a subsequent sample separation task. This may improve the throughput of fluidic sample separated by the sample separation system.

In the following, further embodiments of the injector, the sample separation system, and the method will be explained.

In an embodiment, the valve arrangement (or more specifically the injector) comprises only a single fluid valve. As can be taken from FIG. 2 to FIG. 8, exemplary embodiments of the present invention can be implemented with a single fluid valve of the valve arrangement. For example, such a fluid valve may comprise a stator and a rotor cooperating with the stator and being movable relative to the stator. However, also other fluid valve types than rotary valves may be implemented. The stator may be provided with one or more fluid ports (for instance through holes formed in the stator) each for connecting a respective fluidic member or component of the injector or of the sample separation system. The rotor may be provided with one or more fluid conduits (for instance grooves formed in the rotor) which may be selectively fluidically coupled with or fluidically decoupled from selective ones of ports of the stator. By taking this measure, it is possible to establish a plurality of different fluid connection states by switching the fluid valve. This can be accomplished in a very simple way and in a highly compact way, when only a single fluid valve needs to be provided and operated.

In an embodiment, the sample accommodation volume is fluidically connected with the valve arrangement or forms part of the valve arrangement. For example, the sample accommodation volume may be a sample loop, i.e. a looped fluidic conduit, connected between different ports of the valve arrangement. Alternatively, the sample accommodation volume may be integrated in the valve arrangement, for instance as a groove in stator and/or rotor.

As already mentioned above and more specifically, the valve arrangement may comprise a stator and a rotor being movable relative to the stator, wherein the stator comprises a plurality of ports to be connected at least to the first sample separation apparatus, the second sample separation apparatus and the sample accommodation volume, and the rotor comprises one or more conduits, wherein different fluidic coupling and/or decoupling states between the ports and the one or more conduits are establishable by switching the valve arrangement. Thus, the valve arrangement may be configured in accordance with a rotary valve configuration. Alternatively, it is however also possible that the valve arrangement operates with two valve bodies being slideable relative to one another in a longitudinal direction for establishing the various flow paths.

In an embodiment, the injector is configured for injecting the fluidic sample from the sample accommodation volume into the first sample separation apparatus and/or into the second sample separation apparatus by combining, at a fluidic connection point (such as a fluidic T-piece, Y-piece, X-piece, etc., or any other appropriate "at least three fluidic junction" entity):
- a sample flow from a first inlet flow path supplying the fluidic sample from the sample accommodation volume with
- a mobile phase flow from a second inlet flow path supplying mobile phase of the first sample separation apparatus and/or the second sample separation apparatus
- so that the mobile phase and the fluidic sample are combined at the fluidic connection point to form a common or combined flow flowing into an outlet flow path towards the first sample separation apparatus and/or the second sample separation apparatus for subsequent separation of the fluidic sample.

Thus, the switching and injection architecture of the injector may be of the feed inject type. According to such an embodiment, a first flow of mobile phase may flow from a fluid drive unit (such as a high pressure pump) of one of the sample separation apparatuses towards a sample separation unit (such as a chromatographic separation column) of the one of the sample separation apparatuses. A second fluid stream may be provided by fluidic sample flowing from the sample accommodation volume towards the fluidic connection point where the streams of mobile phase and fluidic sample may be unified or combined to flow as a common or combined stream together towards the sample separation unit of the respective sample separation apparatus.

In an embodiment, the injector or the sample separation system may comprise one or more fluidic connection points. The at least one fluidic connection point may be integrated in the valve arrangement, more specifically in a single fluid valve, of the injector. The at least one fluidic connection point may be formed as a "three fluid connection junction" in the fluid valve and may be defined as an intersection between one or more ports and/or one or more conduits of the fluid valve. In other words, the first and second inlet flow path and the outlet flow path may be located partially or entirely in an interior of the valve arrangement, in particular partially or entirely in an interior of the preferably exactly one fluid valve of the injector.

It should however be said that, as an alternative to the described feed injection architecture, an injector according to an exemplary embodiment of the invention capable of serving multiple sample separation apparatuses for fluidic sample injection may also be configured for switching a sample filled sample accommodation volume into one of the separation paths of the first sample separation apparatus or the second sample separation apparatus. According to such an embodiment, the sample accommodation volume is firstly fluidically decoupled from the separation paths and is only brought in fluidic connection with one or both of the separation paths upon correspondingly switching the injector valve into a corresponding state.

In an embodiment, the sample accommodation volume is provided as a single common sample accommodation volume for accommodating fluidic sample to be injected selectively into a selected one of the first sample separation apparatus and the second sample separation apparatus. Therefore, the compactness of the injector and sample separation system may be further increased by providing a single sample accommodation volume in common for both or all sample separation apparatuses.

In an embodiment, the injector comprises a metering unit configured for driving a metered amount of the fluidic sample to flow into the sample accommodation volume. Such a metering unit may for instance be a syringe pump having a movable piston. The piston may move in a backward direction in order to aspirate, suck or draw fluidic sample from a sample container or the like into the sample accommodation volume. For injecting the aspirated or drawn fluidic sample into the separation path between fluid drive unit and separation column of a respective and selected one of the sample separation apparatuses, the piston of the metering unit may then be moved forwardly. In a feed inject configuration, this may trigger combination of the sample with the mobile phase at a fluidic connection point, i.e. by connecting two flow-in streams into a single flow-out stream.

In an embodiment, the injector comprises a needle and a seat for accommodating the needle. The needle may be configured to be movable out of the seat and into a sample container for transferring fluidic sample from the sample container to the sample accommodation volume, for instance by moving a piston of a metering unit in a backward direction. Moreover, the needle may be drivable back into the seat for establishing a fluid-tight connection between needle and seat and for injecting the transferred fluidic sample from the sample accommodation volume into at least one of the first sample separation apparatus and the second sample separation apparatus, for instance by moving a piston of a metering unit in a forward direction. The needle may thus be driven out of the seat and into a sample container for drawing fluidic sample by withdrawing a piston of a metering unit. Subsequently, the needle may be driven back into the seat and the piston of the metering unit may be moved forwardly for injecting the fluidic sample from the sample accommodation volume into the respectively selected sample separation apparatus for subsequent separation.

In an embodiment, the needle and the seat are provided as a single common needle-seat-arrangement for transferring fluidic sample into a selected one of the first sample separation apparatus and/or the second sample separation apparatus. This combined configuration of the needle-seat-arrangement for serving both or all sample separation apparatuses also contributes to the compactness of the injector and the sample separation system.

In an embodiment, the injector is configured for pre-compressing the fluidic sample in the sample accommodation volume before injecting the pre-compressed fluidic sample into at least one selected one of the first sample separation apparatus and the second sample separation apparatus. When a system pressure between fluid drive unit and separation unit in a respective one of the sample separation apparatuses (for instance a pressure above thousand bar) is significantly larger than the pressure of the fluidic sample in the sample accommodation volume (for instance ambient pressure), an undesired pressure shock may be generated when bringing the respective fluidic paths in fluid communication with one another. However, by pre-compressing the fluidic sample in the sample accommodation volume prior to establishing the fluidic connection with the high-pressure mobile phase, the mentioned pressure shocks and an undesired impact on flow rate, an undesired formation of pressure ripples, etc. may be reduced or even fully eliminated. For instance, pre-compression can be accomplished by the above-mentioned metering unit. This contributes to the compactness of the sample separation system, since a separate pre-compression pump may then be dispensable. However, alternatively, it is also possible to provide a separate pre-compression pump.

In an embodiment, the injector is configured for pre-compressing the fluidic sample in the sample accommodation volume up to a pre-compression pressure value which is below, in particular in a range between 10 bar and 50 bar below, a system pressure value (for instance at least 1000 bar) of at least one of the first sample separation apparatus and the second sample separation apparatus. When pre-compression is carried out so that the pre-compressed fluidic sample is compressed up to a pressure value only slightly below system pressure, an unintentional early flow of fluidic sample into the separation path may be efficiently prevented, in particular in a feed inject configuration. In contrast to this, a small amount of mobile phase may then flow into the sample path, which is however not disturbing. In particular, when the pressure difference is sufficiently small (i.e. in a range between 10 bar and 50 bar, preferably between 10 bar and 20 bar), the remaining pressure difference may be acceptably small.

In an embodiment, the injector is configured for decompressing the sample accommodation volume after injecting fluidic sample from the sample accommodation volume into at least one selected one of the first sample separation apparatus and the second sample separation apparatus and before accommodating further fluidic sample in the sample accommodation volume. Decompressing the sample accommodation volume (which may be still at system pressure, i.e. the pressure generated by a fluid drive unit driving the mobile phase and the fluidic sample in the separation path after sample injection into the first sample separation apparatus and/or the second sample separation apparatus) may be reduced in the sample accommodation volume prior to bringing the latter again in fluid communication with a sample container at lower pressure (for instance at ambient pressure). Therefore, a further pressure shock by switching back the system into a configuration for drawing new fluidic sample may be prevented. By taking this measure, the lifetime of the components of the injector and the entire sample separation system may be further increased. For instance, decompression can be accomplished by the above-mentioned metering unit. This contributes to the compactness of the sample separation system, since a separate decompression pump may then be dispensable. However, alternatively, it is also possible to provide a separate decompression pump, which may be preferably identical to the above-mentioned pre-compression pump, if present.

In an embodiment, the injector comprises a flushing unit configured for flushing the sample accommodation volume, a needle, and a seat. Additionally or alternatively, the flushing unit may be configured for flushing at least a part of fluidic conduits and/or ports of the injector and/or of at least one of the first sample separation apparatus and the second sample separation apparatus. Flushing may be carried out in particular after injection of the fluidic sample from the sample accommodation volume into at least one of the first sample separation apparatus and the second sample separation apparatus. By flushing conduits of the injector and the sample accommodation system between two subsequent separation analysis procedures, undesired carryover of fluidic sample or mobile phase may be efficiently prevented. By taking this measure, the separation accuracy may be kept high, since historic artificial fluid in the conduits and/or ports remaining after a previous sample separation procedure may be prevented.

In an embodiment, the first sample separation apparatus and the second sample separation apparatus are configured for separating the fluidic sample using different separation methods and/or different detection methods. For instance, different separation methods may be chromatography on the one hand and another separation technique (such as gel electrophoresis) on the other hand. Different separation methods may however also be different kinds of chromatography such as liquid chromatography and supercritical fluid chromatography. Also different separation methods (for instance liquid chromatography with isocratic mode and liquid chromatography with gradient mode) may be supported by the various sample separation apparatuses. Additionally or alternatively to the execution of different separation methods carried out by the different sample separation apparatuses, it is also possible to implement different detections in the two sample separation apparatuses. For instance, one sample separation apparatus may operate with a fluorescence detector, whereas another one of the sample separation apparatuses may operate with another type of detector such as a detector measuring in a transmission geometry. Also an optical detector in one sample separation apparatus may be combined with a non-optical detector (for instance a mass spectrometer detector or any kind of destructive detector) in the other sample separation apparatus.

In an embodiment, the first sample separation apparatus and the second sample separation apparatus are configured for separating the fluidic sample using the same separation methods and/or the same detection methods. Using the same separation methods and/or detection methods may for instance be advantageous when a high throughput sample separation is desired in which separation of fluidic sample shall be accomplished temporarily in parallel in two or more sample separation apparatuses, or serially without delay time between subsequent separation runs. The individual sample separation apparatuses may then be configured in an identical or similar manner so that the fluidic sample can be separated with high throughput in the sample separation system.

In an embodiment, the first sample separation apparatus and the second sample separation apparatus are selected from a group consisting of a chromatography apparatus (in particular one of a liquid chromatography apparatus, a gas chromatography apparatus, a supercritical fluid chromatography apparatus, a reversed-phase liquid chromatography apparatus, a normal phase liquid chromatography apparatus, a multi-dimensional chromatography apparatus, a hydrophilic interaction chromatography (HILIC) apparatus, and a high-performance liquid chromatography (HPLC) apparatus), a mass spectrometer apparatus, a gel electrophoresis apparatus, and a solid phase extraction separation apparatus. However, other separation techniques may be implemented in the sample separation system as well.

In an embodiment, the sample separation system comprises one or more third sample separation apparatuses for separating the fluidic sample, wherein the injector is configured for selectively injecting the fluidic sample in at least one of the one or more third sample separation apparatuses, which may be specifically selected by a corresponding position of the valve arrangement. Thus, the functionality of the injector serving two sample separation apparatuses may be extended so as to operate together with three or more sample separation apparatuses. The higher the number of sample separation apparatuses served by the injector, the more it may become appropriate to implement the shared injector architecture with multiple fluid valves rather than a single common fluid valve (which is however still possible, even if such a single fluid valve may then become relatively complex). Thus, the flexibility of a user of getting the fluidic sample separated by different separation methods and/or detectors or increasing throughput of sample separation by using multiple similar or identical sample separation apparatuses may be easily scaled to three or more sample separation apparatuses served by the same injector.

In an embodiment, the first sample separation apparatus and the second sample separation apparatus comprise separate independent flow paths. Thus, the mobile phase flowing from a fluid drive unit of one of the sample separation apparatuses towards a separation unit of the respective sample separation apparatus may flow along a fluid conduit which is completely separate and fluidically decoupled from a corresponding flow path between another fluid drive unit and another separation unit of another of the sample separation apparatuses. By taking this measure, undesired cross-flow between the sample separation paths may be prevented.

In an embodiment, the control unit is configured for controlling the valve arrangement so that a fluidic sample separation procedure runs in one of the first sample separation apparatus and the second sample separation apparatus, while the other of the first sample separation apparatus and the second sample separation apparatus carries out another task. For instance, the other sample separation apparatus may flush at least one conduit with a flush fluid and/or may load fluidic sample to be separated subsequently. In such an embodiment, it is possible that a fluidic sample separation procedure runs in one of the first sample separation apparatus and the second sample separation apparatus, while the other of the first sample separation apparatus and the second sample separation apparatus (which is presently not operated for separation of the fluidic sample) may be in a flush mode for flushing conduits and/or may be in a fluidic sample load mode of loading fluidic sample to be separated subsequently. This renders operation of the sample separation system highly efficient.

In an embodiment, an injector for injecting the fluidic sample to be separated into the defined mobile phase provided by the fluid supply system comprises a needle and a seat configured for accommodating the needle, wherein the needle is drivable towards a sample container for intaking fluidic sample into the sample accommodation volume by the sample drive, and wherein the needle is configured to be drivable to the seat prior to injection. In such a configuration, the fluidic sample may be stored in the sample container (such as a vial). The needle may be driven out of the seat, for instance by a robot, and may be immersed into the fluidic sample in the sample container. Subsequently, a piston of a sample drive (such as a metering pump) may be driven in a backward direction to thereby intake a certain amount of fluidic sample from the sample container via the needle into the fluid accommodation volume. Thereafter, the needle may be driven back into the seat to establish a fluid tight connection there. By switching the fluid valve into the injection switching state, the intaken fluidic sample may be injected from the sample accommodation volume towards the respective separation unit.

In an embodiment, a sample drive or metering unit of an injector comprises a piston configured for moving in opposite directions when intaking fluidic sample (which may involve a backward motion of the piston) and when injecting fluidic sample into the separation path pressing the fluidic sample towards to a respective separation unit in an injection switching state. The piston may be mounted for reciprocating in a piston chamber of the sample drive. For drawing or intaking fluidic sample into the sample accommodation volume, the piston may be moved backwardly so as to draw fluidic sample from a sample container through a needle into the sample accommodation volume.

Embodiments of the above described fluid valve may be implemented with conventionally available HPLC systems, such as the Agilent 1200 Series Rapid Resolution LC system or the Agilent 1150 HPLC series (both provided by the applicant Agilent Technologies—see the website www.agilent.com).

One embodiment of a sample separation apparatus, in which one or more of the above described fluid valves may be implemented, comprises a pumping apparatus as fluid drive or mobile phase drive having a pump piston for reciprocation in a pump working chamber to compress liquid in the pump working chamber to a high pressure at which compressibility of the liquid becomes noticeable. This pumping apparatus may be configured to know (by means of operator's input, notification from another module of the instrument or similar) or elsewise derive solvent properties, which may be used to represent or retrieve actual properties of fluidic content, which is anticipated to be in a sampling apparatus.

The separation unit of a respective one of the sample separation apparatuses preferably comprises a chromatographic column (see for instance the webpage en.widipedia.org/wiki/Column_chromatography) providing the stationary phase. The column may be a glass or steel tube (for instance with a diameter from 50 μm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to minimize the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with afore-mentioned solvents.

The fluidic sample may comprise but is not limited to any type of biological sample, chemical sample, process liquid, natural sample like juice, body fluids like plasma or it may be the result of a reaction like from a fermentation broth.

The pressure, as generated by a fluid drive of a respective one of the sample separation apparatuses, in the mobile phase may range from 2-200 MPa (20 to 2000 bar), in particular 10-150 MPa (150 to 1500 bar), and more particularly 50-120 MPa (500 to 1200 bar).

Any of the sample separation apparatuses, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 1150 HPLC series, both provided by the applicant Agilent Technologies, under the website www.agilent.com.

Embodiments of the invention can be partly or entirely embodied or supported by one or more suitable software programs (or software), which can be stored on or otherwise provided by any kind of non-transitory medium or data carrier, and which might be executed in or by any suitable data processing unit such as such as an electronic processor-based computing device (or system controller, control unit, etc.) that includes one or more electronic processors and memories. Software programs or routines (e.g., computer-executable or machine-executable instructions or code) can be preferably applied in or by the control unit. For example, one embodiment of the present disclosure provides a non-transitory computer-readable medium that includes instructions stored thereon, such that when executed on a processor, the instructions perform the steps of the method of any of the embodiments disclosed herein.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

The illustration in the drawing is schematic.

DETAILED DESCRIPTION

Before describing the figures in further detail, some basic considerations of the present invention will be summarized based on which exemplary embodiments have been developed.

According to an exemplary embodiment of the invention, a dual stream feed injector is provided capable of serving multiple sample separation apparatuses sequentially or simultaneously. In particular, such an injector may integrate two or more samplers in one housing (in particular sharing trays, needle, loop, etc.). A corresponding sample separation system may include two or more independent flow paths, both suitable for separation of a fluidic sample and preferably combined in one valve arrangement, even more preferably in a single fluid valve. A corresponding embodiment has the advantage of having substantially no dead volume in view of the shared use of various fluidic members in the sample separation system.

In an embodiment, various components of the sample separation system, in particular one or more of a metering unit for metering and driving fluidic sample, a loop, a needle and a seat may be purgeable by a flushing unit (which may for instance be embodied by a flush pump being operated with for example three solvents).

It is also possible that a pre-compression forms part of the functionality of the injector allowing a fluidic sample in a sample accommodation volume to be pre-compressed prior to being combined with a mobile phase flowing between a fluid drive unit and a sample separation unit of the respective one of the sample separation apparatuses. Pre-compression may reduce or eliminate pressure shocks occurring during switching a fluid valve and may therefore increase the lifetime of the fluidic members of the sample separation system.

The usage of a corresponding setup may provide a hydraulic junction with the capability to compress and/or decompress an arrangement of loop, needle and/or seat with a corresponding operation of a metering unit before and/or after switching into or out of a flow path between a fluid drive unit and a sample separation unit of a respective one of the sample separation apparatuses. Furthermore, such a metering unit may be self-purgeable with fresh solvent which can be provided by a solvent selection valve or a solvent container.

A corresponding injector architecture may be retrofitted on existing samplers. A metering unit may be rendered purgeable. The mobile phase of each sample separation apparatus can work independently. Therefore, the solvents used in both flow or separation paths can be different, if desired or required. Furthermore, the type of analysis can be different so that, descriptively speaking, a multi-method sample separation system may be provided. For example, it is possible to do HILIC (Hydrophilic Interaction Chromatography) and RP (reversed-phase) applications out of one vial in the injector or sampler without disturbing each other. By using one common injector for operating multiple sample separation apparatuses, bench space may be saved, because a corresponding sample separation system may be embodied with only one stack of modules of fluidic members instead of two.

Exemplary embodiments of the invention may involve one or more of the advantages mentioned in the following:

In order to exclude needle, seat, loop and metering unit from a main path of a first or second separation unit, the setup described herein can be used. Fluidic sample may be taken by plunger movement of a metering unit. The sample draw speed may be adjustable and can be set as method parameter. Only marginal pressure fluctuations (depending on injection/draw mode) may occur, due to sample path pre-compression. Furthermore, a low carryover can be obtained due to a purge position in which also the needle can be lifted to clean the needle-seat interface (with solvent pumped from the metering unit). Beyond this, a draw volume of aspirated fluidic sample may be selectable. There are substantially no limitations concerning such a volume which may thus be selectable in a range of maximum volume of the loop installed. An injector according to an exemplary embodiment of the invention may be operated with a stable pressure of for instance up to 1300 bar or more.

Figure 1:
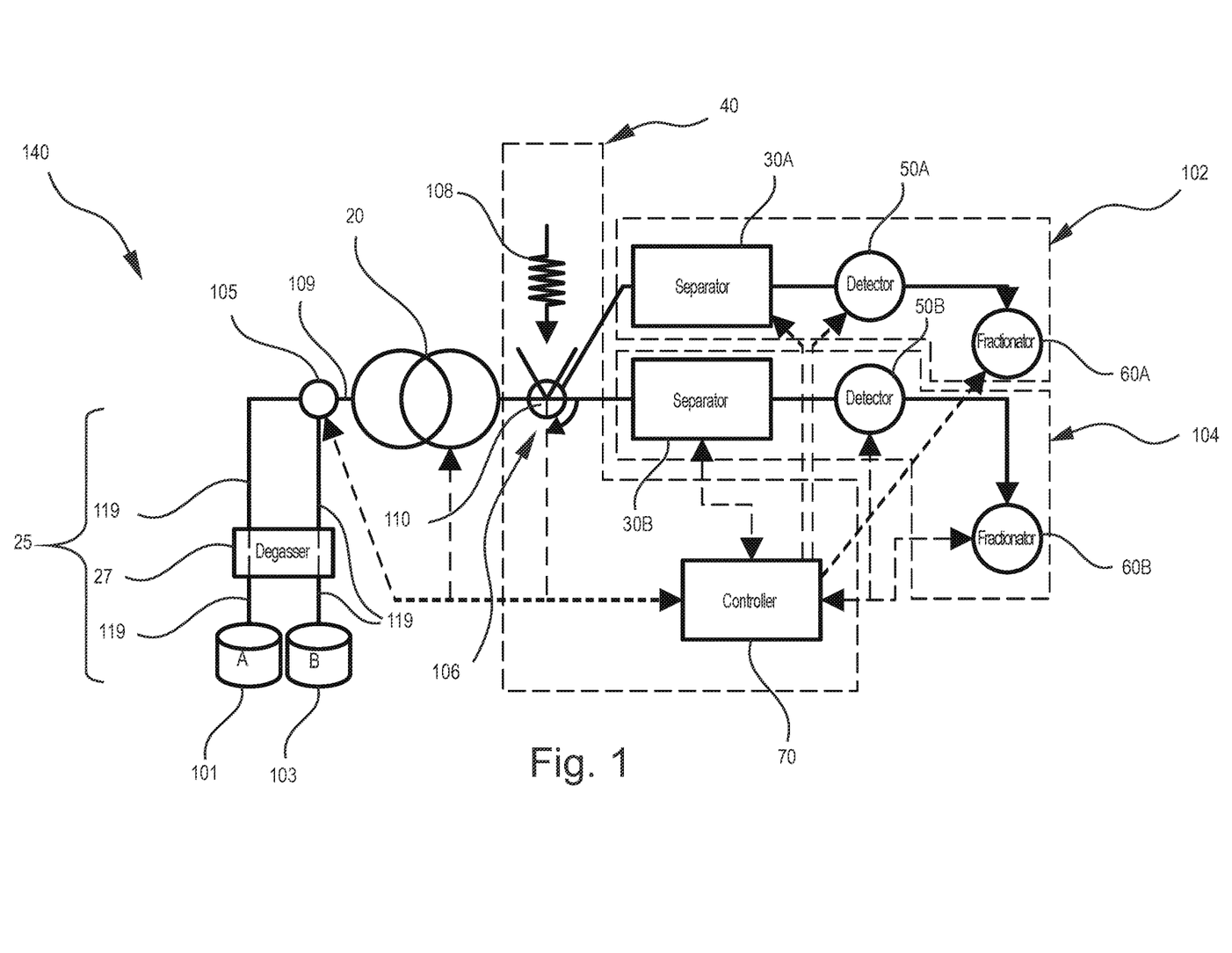
FIG. 1 shows a sample separation system comprising two liquid sample separation apparatuses in accordance with embodiments of the present invention, particularly used in high performance liquid chromatography (HPLC).

Referring now in greater detail to the drawings, FIG. 1 depicts a general schematic of a sample separation system 140 configured as configured as liquid separation system according to an exemplary embodiment of the invention. A pump as fluid drive unit 20 receives a mobile phase from a solvent supply 25, typically via a degasser 27, which degases and thus reduces the amount of dissolved gases in the mobile phase. The mobile phase drive or fluid drive unit 20 drives the mobile phase through a selectable one of two separation units (such as chromatographic columns) comprising a stationary phase, namely a selectable one of a first separation unit 30A and a second separation unit 30B. A single sampler or injector 40, implementing a valve arrangement 106 with a single fluid valve 110, can be provided between the fluid drive unit 20 and the separation units 30A and 30B in order to subject or add (often referred to as sample introduction) a sample fluid into the mobile phase and supply the mixture of mobile phase and fluidic sample to a respective one of the separation units 30A and 30B, depending on a switching state of fluid valve 110. The stationary phase of the separation units 30A and 30B is configured for separating compounds of the sample liquid. A respective one of two detectors, namely a first detector 50A and a second detector 50B, is provided for detecting separated compounds of the sample fluid. A respective fractionating unit, namely a first fractionating unit 60A and a second fractionating unit 60B, can be provided for outputting separated compounds of sample fluid. As shown, each of two sample separation apparatuses 102, 104 comprises a respective separate separation unit 30A or 30B, detector 50A or 50B, and fractionating unit 60A or 60B.

While the mobile phase can be comprised of one solvent only, it may also be mixed from plural solvents. Such mixing might be a low pressure mixing and provided upstream of the fluid drive unit 20, so that the fluid drive unit 20 already receives and pumps the mixed solvents as the mobile phase. Alternatively, the fluid drive unit 20 might be comprised of plural individual pumping units, with plural of the pumping units each receiving and pumping a different solvent or mixture, so that the mixing of the mobile phase (as received by a respective one of the separation units 30A and 30B) occurs at high pressure and downstream of the fluid drive unit 20 (or as part thereof). The composition (mixture) of the mobile phase may be kept constant over time, the so called isocratic mode, or varied over time, the so called gradient mode.

A data processing unit or control unit 70, which can be a PC or workstation, may be coupled (as indicated by the dotted arrows) to one or more of the devices in the sample separation system 140 in order to receive information and/or control operation. For example, the control unit 70 may control operation of the fluid drive unit 20 (for example setting control parameters) and receive therefrom information regarding the actual working conditions (such as output pressure, etc. at an outlet of the pump 20). The control unit 70 may also control operation of the solvent supply 25 (for example setting the solvent/s or solvent mixture to be supplied) and/or the degasser 27 (for example setting control parameters such as vacuum level) and might receive therefrom information regarding the actual working conditions (such as solvent composition supplied over time, vacuum level, etc.). The control unit 70 might further control operation of the sampling unit or injector 40 (for example controlling sample injection or synchronization of sample injection with operating conditions of the fluid drive unit 20). The separation units 30A and 30B might also be controlled by the control unit 70 (for example selecting a specific flow path or column, setting operation temperature, etc.), and send—in return—information (for example operating conditions) to the control unit 70. Accordingly, the detectors 50A and 50B may be controlled by the control unit 70 (for example with respect to spectral or wavelength settings, setting time constants, start/stop data acquisition), and send information (for example about the detected sample compounds) to the control unit 70. The control unit 70 might also control operation of the fractionating units 60A and 60B (for example in conjunction with data received from the detectors 50A and 50B) and provide data back.

The solvent supply 25 is configured for metering liquids in controlled proportions and for supplying a resultant mixture. The solvent supply 25 comprises two reservoirs 101, 103, with each of the reservoirs 101, 103 containing a respective solvent A (in this example water), B (in this example a buffer, i.e. salt dissolved in a solvent). Moreover, it is possible to provide one or more additional reservoirs, for instance an additional reservoir comprising an organic solvent, a further reservoir comprising an optional organic modifier, etc. Each of the reservoirs 101, 103 is fluidically connected via a respective liquid supply line 119 with a proportioning unit 105 which may be configured as proportioning valve. The proportioning unit 105 is configured to connect a selected one of the liquid supply lines 119 with a supply line 109, and to switch between different liquid supply lines 119. The supply line 109 is connected with an inlet of the fluid drive unit 20. Hence, solvent blending is performed at the low-pressure side of the fluid drive unit 20 by metering or proportioning a sequence of fluidic portions.

The fluidic members described above form sample separation system 140 for separating a liquid sample according to an exemplary embodiment of the invention. The sample separation system 140 comprises the first sample separation apparatus 102 for separating the fluidic sample making use of the previously described fluid drive unit 20, one of the sample separation units 30A and one of the detectors 50A. The second sample separation apparatus 104 of the sample separation system 140 also serves for separating liquid sample and makes use of the same fluid drive unit 20 (as shown) or a separate second fluid drive unit (e.g., the first sample separation apparatus 102 may make use of a first fluid drive unit 20A and the second sample separation apparatus 104 may make use of a second fluid drive unit 20A, as shown in FIGS. 2-8), another one of the sample separation units 30B and another one of the detectors 50B. The injector 40 shown in FIG. 1 can be operated, controlled by the control unit 70, for selectively injecting the fluidic sample in the first sample separation apparatus 102 or in the second sample separation apparatus 104, depending on a switching state of fluid valve 110.

Thus, the injector 40 is configured for injecting a fluidic sample in first sample separation apparatus 102 or in second sample separation apparatus 104 depending on a switching state of fluid valve 110. The injector 40 comprises valve arrangement 106 with fluid valve 110 being fluidically connectable to the first sample separation apparatus 102 and to the second sample separation apparatus 104. A sample accommodation volume 108, which may for instance be configured as a sample loop, may serve for temporarily accommodating the fluidic sample before it is supplied to one of the first sample separation apparatus 102 and the second sample separation apparatus 104. The control unit 70 is programmed for controlling the valve arrangement 106, i.e. for controlling switching of the fluid valve 110, so that the fluidic sample in the sample accommodation volume 108 is selectively injected from sample accommodation volume 108 either [in] into the first sample separation apparatus 102 or into the second sample separation apparatus 104 for subsequent separation. In an embodiment, it may also be possible to split fluidic sample in the sample accommodation volume 108 so as to be partially separated by the first sample separation apparatus 102, while another part of the fluidic sample will be separated by the second sample separation apparatus 104. Injector 40 serves for injecting fluidic sample into a selectable one of the first sample separation apparatus 102 and the second sample separation apparatus 104.

In the embodiment according to FIG. 1, the injector 40 may hence be switched to either inject the fluidic sample from the sample accommodation volume 108 into the first sample separation apparatus 102 or into the second sample separation apparatus 104. The first sample separation apparatus 102 with the first separation unit 30A, first detector 50A and first fractioner 60A has been described above and is driven by fluid drive unit 20. In a corresponding way, the second sample separation apparatus 104 is operated by the same fluid drive unit 20, but has a separate, second separation unit 30B, second detector 50B and second fractioner 60B. By correspondingly switching the injector 40, the fluidic sample may be supplied from the sample accommodation volume 108 either in only the first sample separation apparatus 102, or in only the second sample separation apparatus 104, or in both sample separation apparatuses 102, 104. The corresponding operation mode of the injector 40 may be adjusted for example automatically under control of the control unit 70, or may be input inputted by a user via a corresponding user input.

FIG. 2 to FIG. 6 illustrate different operation states of an injector 40 operating two sample separation devices 102, 104 according to an exemplary embodiment of the invention. Referring to FIG. 2 to FIG. 6, a sample separation system 140 with a dual stream feed injector 40 according to an exemplary embodiment of the invention is shown.

The first sample separation apparatus 102 and the second sample separation apparatus 104 of the sample separation system 140 are each configured for separating fluidic sample accommodated in a sample accommodation volume 108, which is here embodied as a sample loop, i.e. as a looped fluidic conduit. Operation of the first sample separation apparatus 102 and of the second sample separation apparatus 104 may be carried out using different or the same separation methods (for instance a chromatographic sample separation in a gradient mode, and another chromatographic sample separation in an isocratic mode) and/or different detection methods (for instance using a fluorescence detector and a mass spectrometer). It is however also possible that the sample separation apparatuses 102, 104 carry out the same separation method and/or use the same detection method. In the shown embodiment, both the first sample separation apparatus 102 and the second sample separation apparatus 104 may be liquid chromatography apparatuses. As shown in FIG. 2 to FIG. 6, the first sample separation apparatus 102 and the second sample separation apparatus 104 comprise separate independent flow paths, enabling the use of different mobile phases, if desired or required, for the sample separation apparatuses 102, 104.

Figures 2, 2A:
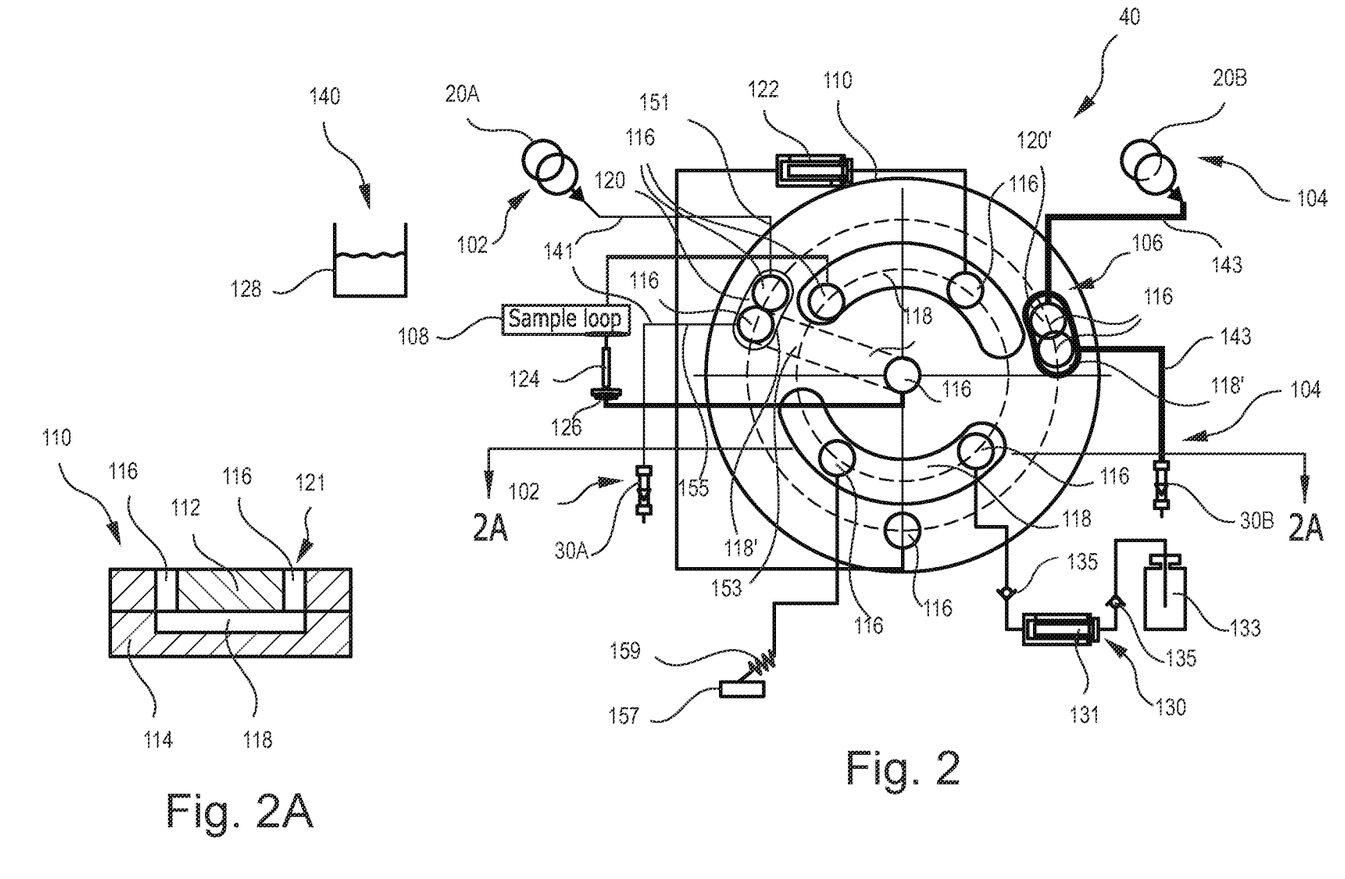
FIG. 2 illustrates an operation state of an injector operating two sample separation apparatuses of a sample separation system according to an exemplary embodiment of the invention.
FIG. 2A illustrates a cross-sectional view of a region of the injector illustrated in FIG. 2 corresponding to line 2A-2A.

As shown in a detail 121 in FIG. 2A illustrating a cross-section of fluid valve 110 of valve arrangement 106 of the injector 40, the fluid valve 110 is composed of a stator 112, which remains stationary during operation, and a rotor 114, which may be rotated relative to the stator 112 during operation. The stator 112 comprises a plurality of ports 116 to be connected to conduits 141 of the first sample separation apparatus 102, to conduits 143 of the second sample separation apparatus 104, to the sample accommodation volume 108, to a metering unit 122, to a seat 126 cooperating with a needle 124, to a flushing unit 130, and to a waste line 157. The rotor 114 comprises multiple fluidic conduits 118 which are here embodied in form of arcuate and radial grooves in the rotor 114. Different fluidic coupling states and/or decoupling states are establishable between the mentioned fluidic members connected to the ports 116 by switching the valve arrangement 106 so that, in each switching state, the fluidic conduits 118 may couple respective ports 116, or not (compare FIG. 2 to FIG. 6).

As can be taken from FIG. 2, some of the conduits 118 are shaped as arcuate grooves formed in the rotor 114, wherein another one of the conduits 118 is arranged as a radially extending groove in the rotor 114. The before mentioned arcuate and radial grooves may be located in the same or different planes perpendicular to the paper plane of FIG. 2 to FIG. 6, but may be switched simultaneously. In contrast to this, two shorter arcuate grooves are formed also in the stator 112 and therefore remain at the same angular position in each of FIG. 2 to FIG. 6. For the sake of simplicity, the conduits 118 and the ports 116 are only shown in FIG. 2.

The illustrated injector 40 is configured for injecting pre-loaded or aspirated fluidic sample from the sample accommodation volume 108 into a flow path (see conduits 141) between a first fluid drive unit 20A and a first sample separation unit 30A of the first sample separation apparatus 102 in one switching state of the fluid valve 110. In another switching state of the fluid valve 110, the shown injector 40 is configured for injecting pre-loaded fluidic sample from the sample accommodation volume 108 into a flow path (see conduits 143) between another, second fluid drive unit 20B and another, second sample separation unit 30B of the second sample separation apparatus 104.

Moreover, the injector 40 is configured for combining, at a respective first fluidic connection point 120 or second fluidic connection point 120', a flow path of the fluidic sample with another flow path of mobile phase flowing in a respective one of the first sample separation apparatus 102 and the second sample separation apparatus 104 between a respective fluid drive unit 20A or 20B and sample separation unit 30A or 30B.

Referring to FIG. 2, a sample flow from a first inlet flow path 153 supplying the fluidic sample may be connected with another mobile phase flow from a second inlet flow path 151 supplying mobile phase of first sample separation apparatus 102 at the first fluidic connection point 120. Consequently, the mobile phase and the fluidic sample may be combined at the first fluidic connection point 120 to flow into an outlet flow path 155 towards the first sample separation apparatus 102.

Figure 5:
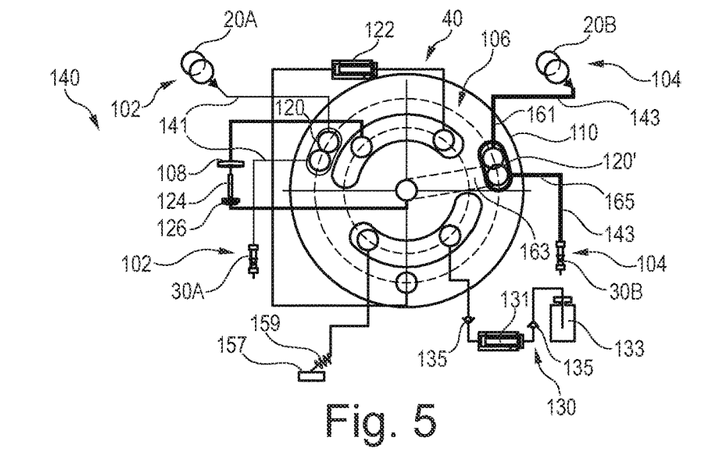
FIG. 5 illustrates a different operation state of the injector illustrated in FIG. 2.

Referring to FIG. 5, a sample flow from a first inlet flow path 163 supplying the fluidic sample may be connected with another mobile phase flow from a second inlet flow path 161 supplying mobile phase of second sample separation apparatus 104 at the second fluidic connection point 120'. Consequently, the mobile phase and the fluidic sample may be combined at the second fluidic connection point 120' to flow into an outlet flow path 165 towards the second sample separation apparatus 104.

As shown, only one single common sample accommodation volume 108 is provided for accommodating fluidic sample to be injected selectively into the first sample separation apparatus 102 or the second sample separation apparatus 104. Since the injector 40 serves two sample separation apparatuses 102, 104 simultaneously, the injector 40 and consequently the sample separation system 140 may be formed in a compact way. Correspondingly, only one single common metering unit 122 is provided and configured for driving the fluidic sample to flow from a sample container 128 into the sample accommodation volume 108, and later from the sample accommodation volume 108 into one of the first and second sample separation apparatuses 102, 104. For this purpose, the sample accommodation volume 108 and the metering unit 122 cooperate with needle 124 and seat 126 of a cooperating needle-seat arrangement. The needle 124 may be moved out of the seat 126 (not shown) and into sample container 128 containing fluidic sample. When the needle 124 is immersed in the fluidic sample in the sample container 128, fluidic sample may be transferred from the sample container 128, via the needle 124 into the sample accommodation volume 108 by withdrawing a piston of the metering unit 122. After such a sample intake, the needle 124 may be driven back into the seat 126 to form a fluid tight coupling with the seat 126 (as shown in FIG. 2 to FIG. 6). Thereafter, the transferred fluidic sample may be injected from the sample accommodation volume 108 into the first sample separation apparatus 102 or into the second sample separation apparatus 104, depending on a switching state of the fluid valve 110. Also the needle 124 and the seat 126 are provided as a single common needle-seat-arrangement and are configured for transferring fluidic sample into the first sample separation apparatus 102 or the second sample separation apparatus 104.

The illustrated sample separation system 140 is further configured for pre-compressing the fluidic sample in the sample accommodation volume 108 (initially at ambient pressure) by a corresponding operation of the metering unit 122 before injecting the pre-compressed fluidic sample into the first sample separation apparatus 102 or into the second sample separation apparatus 104 (which may be at a high pressure level, for instance 1400 bar). Advantageously, such a pre-compression of the fluidic sample in the sample accommodation volume 108 may be performed up to a pre-compression pressure value which is intentionally slightly below (for instance 10 bar below) a system pressure value (i.e. the above-mentioned high pressure of for example 1400 bar) of the first sample separation apparatus 102 or the second sample separation apparatus 104. In a corresponding way, the sample separation system 140 is configured for decompressing the sample accommodation volume 108 after injecting fluidic sample from the sample accommodation volume 108 (which may still be at system pressure) into the first sample separation apparatus 102 or the second sample separation apparatus 104 and before accommodating further fluidic sample in the sample accommodation volume 108 (again at ambient pressure).

Furthermore, the sample separation system 140 shown in FIG. 2 to FIG. 6 comprises a flushing unit 130 configured for flushing fluidic conduits 118 and/or ports 116 of the injector 40 with a flushing fluid which is thereafter guided, optionally via a fluidic restriction 159, into a waste 157. The flushing fluid may also be guided through the sample accommodation volume 108, the needle 124, and the seat 126 as well as through the metering unit 122. Such a flushing may be carried out for cleaning purposes after injection of the fluidic sample from the sample accommodation volume 108 into the first sample separation apparatus 102 or the second sample separation apparatus 104. The waste 157 is connected via schematically illustrated fluid resistance 159 to one of the ports 116 of the fluid valve 110. As can be taken from FIG. 2 as well, the flushing unit 130 is composed of a flushing metering unit 131 and a flushing container 133 comprising a flushing fluid. Furthermore, various check valves 135 are shown as well.

Referring now in detail to FIG. 2, fluidic sample in sample accommodation volume 108 is injected in a flow path between the first fluid drive unit 20A and the first sample separation unit 30A of first sample separation apparatus 102.

In FIG. 2, the injector 40 is in a feed configuration in which fluidic sample which has previously been loaded in the sample accommodation volume 108 is injected into the first sample separation apparatus 102. For this purpose, the fluidic sample from the sample accommodation volume 108 and mobile phase flowing along a flow path between the first fluid drive unit 20A and the first separation unit 30A of the first sample separation apparatus 102 are combined at the first fluidic connection point 120 in static conduit 118'. Thus, mobile phase flows from the first fluid drive unit 20A via static groove 118' and first fluidic connection point 120 to the first separation column 30A of the first sample separation apparatus 102. At the same time, the metering unit 122 moves its piston forwardly to thereby press fluidic sample in sample accommodation volume 108 through needle 124, seat 126 and the central port 116 of fluid valve 110 via radial groove conduit 118 and static groove 118' to the first fluidic connection point 120. At the first fluidic connection point 120, the mobile phase and the fluidic sample are combined to flow together as a common fluid stream towards the first separation unit 30A of the first sample separation apparatus 102.

At the same time, in a completely separate flow path, other mobile phase may be transported from the second fluid drive unit 20B via static groove 118' towards the second sample separation unit 30B of the second sample separation apparatus 104.

Figure 3:
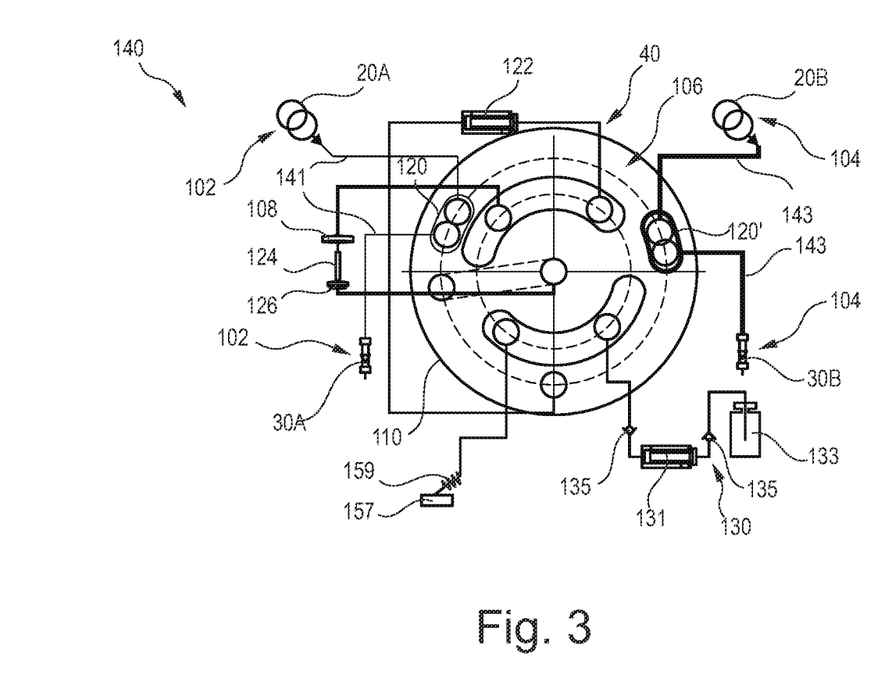
FIG. 3 illustrates a different operation state of the injector illustrated in FIG. 2.

Referring to FIG. 3, a drawing and pre-compression position of the fluid valve 110 for drawing and pre-compressing fluidic sample to be subsequently separated in first sample separation apparatus 102 is shown.

The compress state according to FIG. 3 corresponds to an operation mode of the injector 40 after having filled the sample accommodation volume 108 with fluidic sample from sample container 128 and before switching the injector 40 into the operation mode according to FIG. 2 for injecting the fluidic sample into the first sample separation apparatus 102. Prior to starting this compress operation mode according to FIG. 3, the needle 124 may be driven out of the seat 126 and may be immersed in the sample container 128 shown in FIG. 2. Then, the piston of the metering unit 122 may be driven in a backward direction so as to aspirate or draw fluidic sample from the sample container 128 through needle 124 into sample accommodation volume 108 in the valve state according to FIG. 3. Thereafter, the fluidic sample in the sample accommodation volume 108 is still at a low pressure, for instance atmospheric pressure. In order to prevent or at least dampen or reduce a pressure shock occurring when feeding the fluidic sample into the flow path of the first sample separation apparatus 102 (being at system pressure of for example 1400 bar), the needle 124 may firstly be driven back into the seat 126 in the switching state of valve 110 according to FIG. 3. Then, the piston of the metering unit 122 may be moved forwardly so as to pre-compress the fluidic sample in the sample accommodation volume 108, for instance up to a pressure of about 10 bar below system pressure of for instance 1400 bar.

Figure 4:
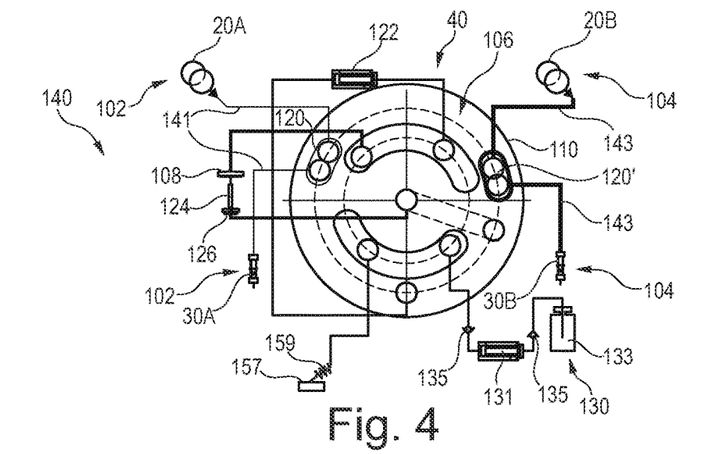
FIG. 4 illustrates a different operation state of the injector illustrated in FIG. 2.

Referring to FIG. 4, a drawing and pre-compression position of the fluid valve 110 for drawing and pre-compressing fluidic sample to be subsequently separated in second sample separation apparatus 104 is shown.

The compress state according to FIG. 4 corresponds to an operation mode of the injector 40 after having filled the sample accommodation volume 108 with fluidic sample from sample container 128 and before switching the injector 40 into the operation mode according to FIG. 5 for injecting the fluidic sample into the second sample separation apparatus 104. Prior to starting this compress operation mode according to FIG. 4, the needle 124 may be driven out of the seat 126 and may be immersed in the sample container 128 shown in FIG. 2. Then, the piston of the metering unit 122 may be driven in a backward direction so as to aspirate or draw fluidic sample from the sample container 128 through needle 124 into sample accommodation volume 108 in the valve state according to FIG. 4. Thereafter, the fluidic sample in the sample accommodation volume 108 is still at a low pressure, for instance atmospheric pressure. In order to prevent or at least dampen or reduce a pressure shock occurring when feeding the fluidic sample into the flow path of the second sample separation apparatus 104 (being at system pressure of for example 1400 bar), the needle 124 may firstly be driven back into the seat 126 in the switching state of valve 110 according to FIG. 4. Then, the piston of the metering unit 122 may be moved forwardly so as to pre-compress the fluidic sample in the sample accommodation volume 108, for instance up to a pressure of about 10 bar below system pressure of for instance 1400 bar.

Referring to FIG. 5, a feed operation mode concerning the second sample separation apparatus 104 is shown.

FIG. 5 shows a subsequent feed operation mode, i.e. an operation mode in which the drawn and pre-compressed fluidic sample in the sample accommodation volume 108, see FIG. 4, is injected with a feed injection operation mode into the flow path between the second fluid drive unit 20B and the second sample separation unit 30B of the second sample separation apparatus 104. This occurs at the further, second fluidic connection point 120'. As shown in FIG. 5, mobile phase is pumped from the second fluid drive unit 20B through the static arcuate groove corresponding to the further, second fluidic connection point 120' towards the second sample separation unit [30] 30B of the second sample separation apparatus 104. The piston of the metering unit 122 is moved forwardly to thereby push the fluidic sample from the sample accommodation volume 108 via needle 124, seat 126, central port 116, radial conduit 118 and radial static conduit 118' towards the second fluidic connection point 120' so as to be combined or unified with the previously described flow of mobile phase originating from the second sample separation apparatus 104. Thus, mobile phase and fluidic sample are transported, under operation of the second fluid drive unit 20B of the second sample separation apparatus 104 towards the second sample separation unit 30B of the second sample separation apparatus 104 for separation of the fluidic sample into fractions.

Figure 6:
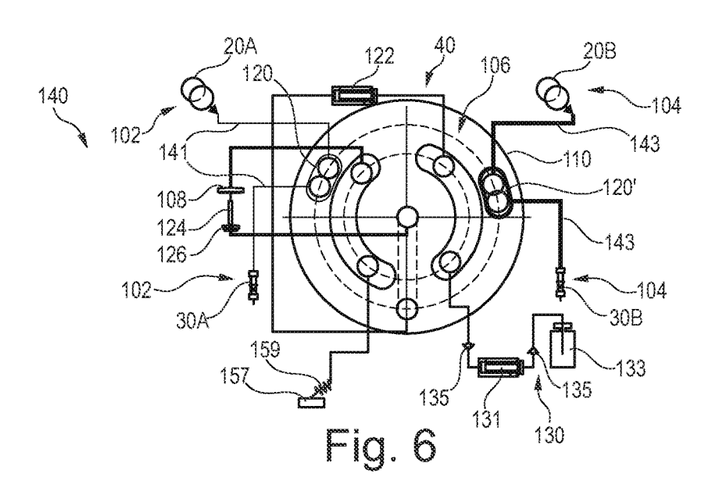
FIG. 6 illustrates a different operation state of the injector illustrated in FIG. 2.

Referring to FIG. 6, a flush or purge mode is illustrated.

FIG. 6 shows the injector 40 and corresponding fluid valve 110 in a purge or flush mode. In this operation mode, the purge or flushing unit 130 may pump flush fluid from flush container 133, driven by flush pump 131 through metering unit 122, seat 126, needle 124, sample accommodation volume 108 and valve arrangement 106 to waste 157.

In order to operate the sample separation system 140 according to FIG. 2 to FIG. 6 in a cyclic mode, it is for instance possible to firstly draw sample in the draw/compress state according to FIG. 3 for subsequent feeding into first sample separation apparatus 102, to pre-compress the drawn fluidic sample in the sample accommodation volume 108 subsequently, and to switch the injector 40 into the feed configuration according to FIG. 2. Subsequently, the system may be switched back to the configuration according to FIG. 3 for decompressing the sample accommodation volume 108 from system pressure to a smaller pressure (for instance ambient pressure), to prevent pressure shocks, by withdrawing the piston of metering unit 122. Thereafter, it is possible to switch the injector 40 into the purge or flush configuration according to FIG. 6 in order to clean the various components and conduits, as described above. In order to subsequently carry out sample separation in second sample separation apparatus 104, it is then possible to switch the injector 40 into the configuration according to FIG. 4 for drawing fluidic sample into sample accommodation volume 108 and to pre-compress the fluidic sample to avoid pressure shocks. Thereafter, the injector 40 can be switched into the configuration according to FIG. 5 for feeding the drawn fluidic sample from the sample accommodation volume 108 at the second fluidic connection point 120' into the separation path between the second fluid drive unit 20B and the second separation unit 30B of the second sample separation apparatus 104 for separation of the fluidic sample there. Thereafter, the injector 40 may be switched back into the configuration according to FIG. 4 for decompressing the sample accommodation volume 108 from system pressure to a smaller pressure (for instance ambient pressure), to prevent pressure shocks, by withdrawing the piston of metering unit 122. The described procedure can be repeated for any desired sequence of sample separation in any of the sample separation apparatuses 102, 104.

Figure 7:
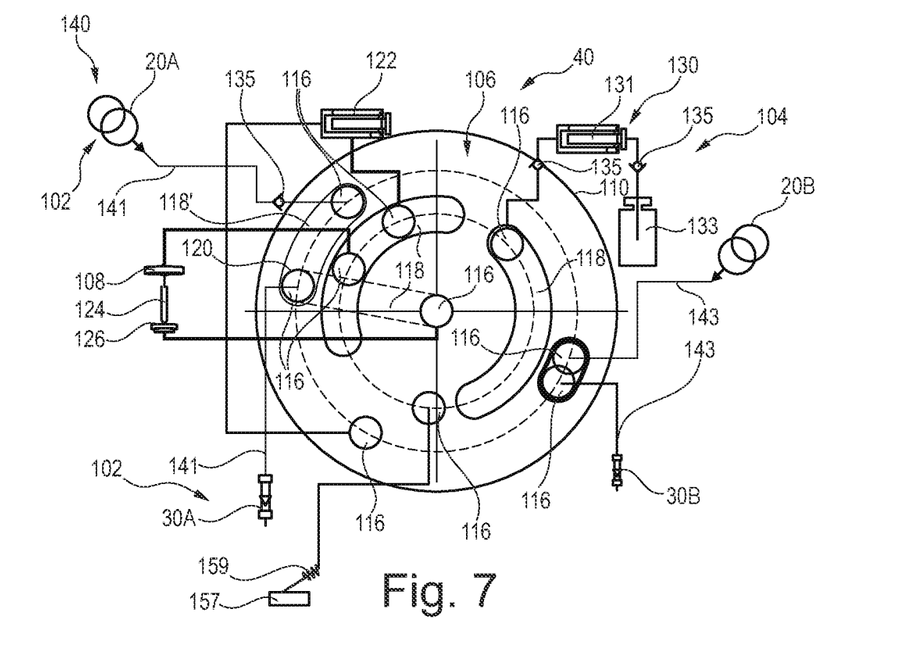
FIG. 7 illustrates an injector operating two sample separation apparatuses of a sample separation system according to another exemplary embodiment of the invention.
Figure 8:
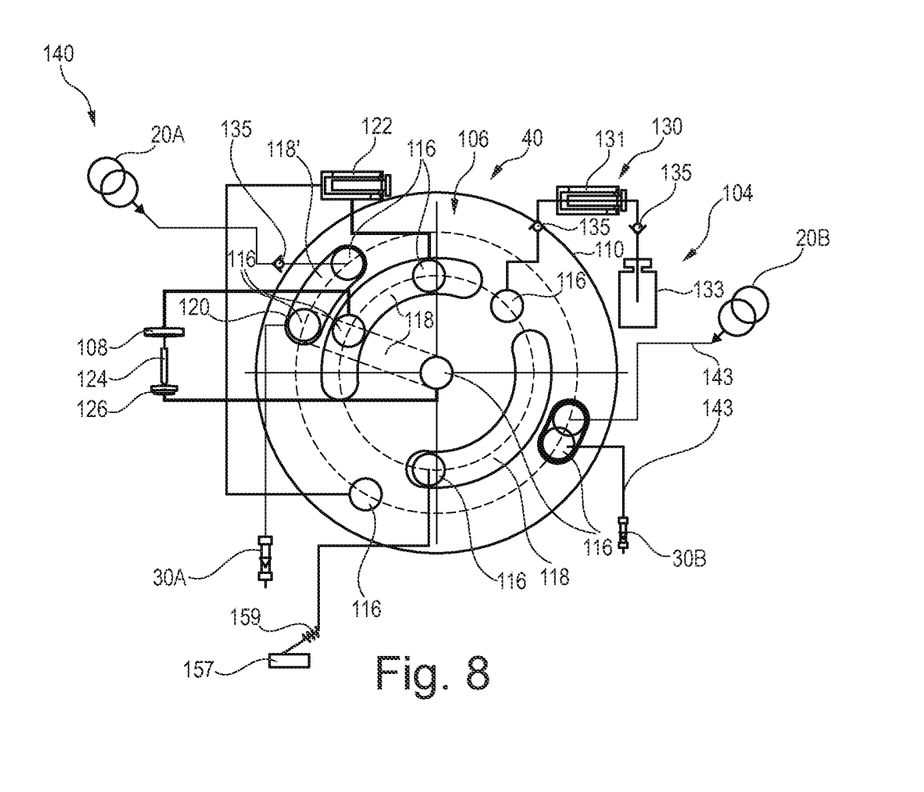
FIG. 8 illustrates an injector operating two sample separation apparatuses of a sample separation system according to another exemplary embodiment of the invention.

FIG. 7 and FIG. 8 illustrate injectors 40 operating two sample separation devices 102, 104 according to other exemplary embodiments of the invention.

The configuration according to FIG. 7 differs from the configuration according to FIG. 2 to FIG. 6 concerning the design of the single fluid valve 110.

FIG. 8 differs from the embodiment of FIG. 7 by yet another valve design.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. An injector for injecting a fluidic sample into at least one selected one of a first sample separation apparatus and a second sample separation apparatus, wherein the first sample separation apparatus and the second sample separation apparatus comprise separate independent flow paths, the first sample separation apparatus comprises a first fluid drive unit configured for driving a first mobile phase and/or the fluidic sample and a first sample separation unit configured for separating the fluidic sample, and the second sample separation apparatus comprises a second fluid drive unit configured for driving a second mobile phase and/or the fluidic sample and a second sample separation unit configured for separating the fluidic sample, the injector comprising:
a valve arrangement fluidically connectable to the first sample separation apparatus and to the second sample separation apparatus, wherein the valve arrangement comprises a single fluid valve;
a sample accommodation volume for accommodating the fluidic sample, wherein the sample accommodation volume is provided as a single common sample accommodation volume for accommodating the fluidic sample to be injected selectively into the at least one selected one of the first sample separation apparatus and the second sample separation apparatus, wherein:
the fluid valve is switchable to at least one feed injection state at which the fluid valve establishes at least one fluidic connection point; and
the fluid valve is configured to inject the fluidic sample into the at least one selected one of the first sample separation apparatus and the second sample separation apparatus by combining, at the at least one fluidic connection point, a sample flow from a first inlet flow path supplying the fluidic sample from the sample accommodation volume with a mobile phase flow from a second inlet flow path supplying the first mobile phase or the second mobile phase, so that a combination of the fluidic sample and the first mobile phase or the second mobile phase flows from the at least one fluidic connection point into at least one outlet flow path towards at least one the first sample separation apparatus or the second sample separation apparatus; and
a control unit configured to control the valve arrangement so that the fluidic sample in the sample accommodation volume is selectively injectable into at least one of the first sample separation apparatus or the second sample separation apparatus.

2. The injector according to claim 1, wherein the sample accommodation volume is fluidically connected with the valve arrangement or forms part of the valve arrangement.

3. The injector according to claim 1, wherein the valve arrangement comprises a stator and a rotor being movable relative to the stator, wherein the stator comprises a plurality of ports to be connected at least to the first sample separation apparatus, the second sample separation apparatus and the sample accommodation volume, and the rotor comprises one or more conduits, wherein different fluidic coupling and/or decoupling states between the ports and the one or more conduits are establishable by switching the valve arrangement.

4. The injector according to claim 1, comprising a metering unit configured for driving the fluidic sample to flow into the sample accommodation volume.

5. The injector according to claim 1, comprising a needle and a seat, wherein the needle is configured to be movable out of the seat and into a sample container for transferring the fluidic sample from the sample container into the sample accommodation volume, and wherein the needle is drivable back into the seat for injecting the transferred fluidic sample from the sample accommodation volume into the at least one selected one of the first sample separation apparatus or the second sample separation apparatus.

6. The injector according to claim 5, wherein the needle and the seat are provided as a single common needle-seat arrangement for transferring the fluidic sample.

7. The injector according to claim 1, configured for pre-compressing the fluidic sample in the sample accommodation volume before injecting the fluidic sample into the at least one selected one of the first sample separation apparatus and the second sample separation apparatus.

8. The injector according to claim 7, configured for pre-compressing the fluidic sample in the sample accommodation volume up to a pre-compression pressure value which is below a system pressure value of at least one of the first sample separation apparatus or the second sample separation apparatus.

9. The injector according to claim 1, configured for decompressing the sample accommodation volume after injecting the fluidic sample into the at least one selected one of the first sample separation apparatus and the second sample separation apparatus and before accommodating further fluidic sample in the sample accommodation volume.

10. The injector according to claim 1, comprising a flushing unit configured to flush at least one selected from the group consisting of: the sample accommodation volume; a needle; a seat; at least a part of ports of the injector; at least a part of conduits of the injector; and at least a part of conduits of at least one of the first sample separation apparatus or the second sample separation apparatus.

11. The injector according to claim 1, wherein the control unit is configured to control the valve arrangement so that a fluidic sample separation procedure runs in one of the first sample separation apparatus or the second sample separation apparatus, while the other of the first sample separation apparatus and the second sample separation apparatus performs another task.

12. The injector according to claim 1, wherein:
the at least one feed injection state comprises a first feed injection state and a second feed injection state;
the at least one fluidic connection point comprises a first fluidic connection point and a second fluidic connection point;
the at least one outlet flow path comprises a first outlet flow path and a second outlet flow path;

at the first feed injection state, the fluid valve is configured to inject the fluidic sample from the sample accommodation volume into the first sample separation apparatus by combining, at the first fluidic connection point, the sample flow from the first inlet flow path supplying the fluidic sample from the sample accommodation volume with the mobile phase flow from the second inlet flow path supplying the first mobile phase, so that a combination of the fluidic sample and the first mobile phase flows from the first fluidic connection point into the first outlet flow path towards the first sample separation apparatus; and at the second feed injection state, the fluid valve is configured to inject the fluidic sample from the sample accommodation volume into the second sample separation apparatus by combining, at the second fluidic connection point, the sample flow from the first inlet flow path supplying the fluidic sample from the sample accommodation volume with a mobile phase flow from a further second inlet flow path supplying the second mobile phase, so that a combination of the fluidic sample and the second mobile phase flows from the second fluidic connection point into the second outlet flow path towards the second sample separation apparatus.

13. The injector according to claim 1, wherein the at least one fluidic connection point is integral with the fluid valve.

14. A sample separation system for separating a fluidic sample, the sample separation system comprising:
  a first sample separation apparatus for separating the fluidic sample;
  a second sample separation apparatus for separating the fluidic sample; and
  an injector comprising:
    a valve arrangement fluidically connectable to the first sample separation apparatus and the second sample separation apparatus, wherein the valve arrangement comprises a single fluid valve; and
    a sample accommodation volume for accommodating the fluidic sample, wherein the sample accommodation volume is provided as a single common sample accommodation volume for accommodating the fluidic sample to be injected selectively into at least one selected one of the first sample separation apparatus and the second sample separation apparatus wherein:
      the fluid valve is switchable to at least one feed injection state at which the fluid valve establishes at least one fluidic connection point; and
      the fluid valve is configured to inject the fluidic sample into the at least one selected one of the first sample separation apparatus and the second sample separation apparatus by combining, at the at least one fluidic connection point, a sample flow from a first inlet flow path supplying the fluidic sample from the sample accommodation volume with a mobile phase flow from a second inlet flow path supplying the first mobile phase or the second mobile phase, so that a combination of the fluidic sample and the first mobile phase or the second mobile phase flows from the at least one fluidic connection point into at least one outlet flow path towards at least one the first sample separation apparatus or the second sample separation apparatus; and
  a control unit configured to control the valve arrangement so that the fluidic sample in the sample accommodation volume is selectively injectable into at least one of the first sample separation apparatus or the second sample separation apparatus.

15. The sample separation system according to claim 14, wherein the first sample separation apparatus and the second sample separation apparatus are configured for separating the fluidic sample using different separation methods and/or different detection methods.

16. The sample separation system according to claim 14, wherein the first sample separation apparatus and the second sample separation apparatus are configured for separating the fluidic sample using the same separation methods and/or the same detection methods.

17. The sample separation system according to claim 14, further comprising at least one of the following features:
  wherein the first sample separation apparatus and the second sample separation apparatus are selected from the group consisting of: a chromatography apparatus; a liquid chromatography apparatus; a gas chromatography apparatus; a supercritical fluid chromatography apparatus; a reversed-phase liquid chromatography apparatus; a normal-phase liquid chromatography apparatus; a multi-dimensional chromatography apparatus; a HILIC apparatus; an HPLC apparatus; a mass spectrometer apparatus; a gel electrophoresis apparatus; and a solid phase extraction separation apparatus;
  comprising at least one third sample separation apparatus for separating the fluidic sample, wherein the injector is configured for selectively injecting the fluidic sample in at least one selected one of the at least one third sample separation apparatus;
  wherein at least one of the first sample separation apparatus or the second sample separation apparatus comprises a detector configured to detect separated fractions of the fluidic sample;
  wherein at least one of the first sample separation apparatus or the second sample separation apparatus comprises a fractionating unit configured to collect separated fractions of the fluidic sample;
  wherein at least one of the first sample separation apparatus or the second sample separation apparatus comprises a degassing apparatus for degassing mobile phase before injecting the fluidic sample in the mobile phase.

18. The sample separation system according to claim 14, wherein the at least one fluidic connection point is integral with the fluid valve.

19. A method of injecting a fluidic sample selectively into at least one of a first sample separation apparatus and a second sample separation apparatus, the method comprising:
  accommodating the fluidic sample in a single common sample accommodation volume; and
  switching a valve arrangement fluidically connectable to the first sample separation apparatus and to the second sample separation apparatus so that the fluidic sample in the sample accommodation volume is selectively injected into at least one selected one of the first sample separation apparatus and the second sample separation apparatus depending on a switching state of the valve arrangement, wherein;
  the valve arrangement comprises a single fluid valve;
  the switching of the valve arrangement comprises switching the fluid valve to at least one feed injection state at which the fluid valve establishes at least one fluidic connection point; and
  the fluid valve is configured to inject the fluidic sample into the at least one selected one of the first sample separation apparatus and the second sample separation apparatus by combining, at the at least one fluidic connection point, a sample flow from a first inlet flow path supplying the fluidic sample from the sample accommodation volume with a mobile phase flow from a second inlet flow path supplying the first mobile phase or the second mobile phase, so that a combination of the fluidic sample and the first mobile phase or the second mobile phase flows from the at least one fluidic connection point into at least one outlet flow path towards at least one the first sample separation apparatus or the second sample separation apparatus.

20. The method according to claim 19, comprising at least one of the following features:
pre-compressing the fluidic sample in the sample accommodation volume before injecting the fluidic sample into the at least one selected one of the first sample separation apparatus and the second sample separation apparatus;
decompressing the sample accommodation volume after injecting the fluidic sample into the at least one selected one of the first sample separation apparatus and the second sample separation apparatus and before accommodating further fluidic sample in the sample accommodation volume;
flushing at least one selected from the group consisting of: the sample accommodation volume; a needle; a seat; at least a part of ports; and at least part of conduits;
running a fluidic sample separation procedure in one of the first sample separation apparatus or the second sample separation apparatus, while the other of the first sample separation apparatus and the second sample separation apparatus performs another task.

* * * * *